W. A. GILLETTE.
ROTARY ROAD SCARIFIER.
APPLICATION FILED SEPT. 1, 1910.
978,016.
Patented Dec. 6, 1910.
2 SHEETS—SHEET 1.
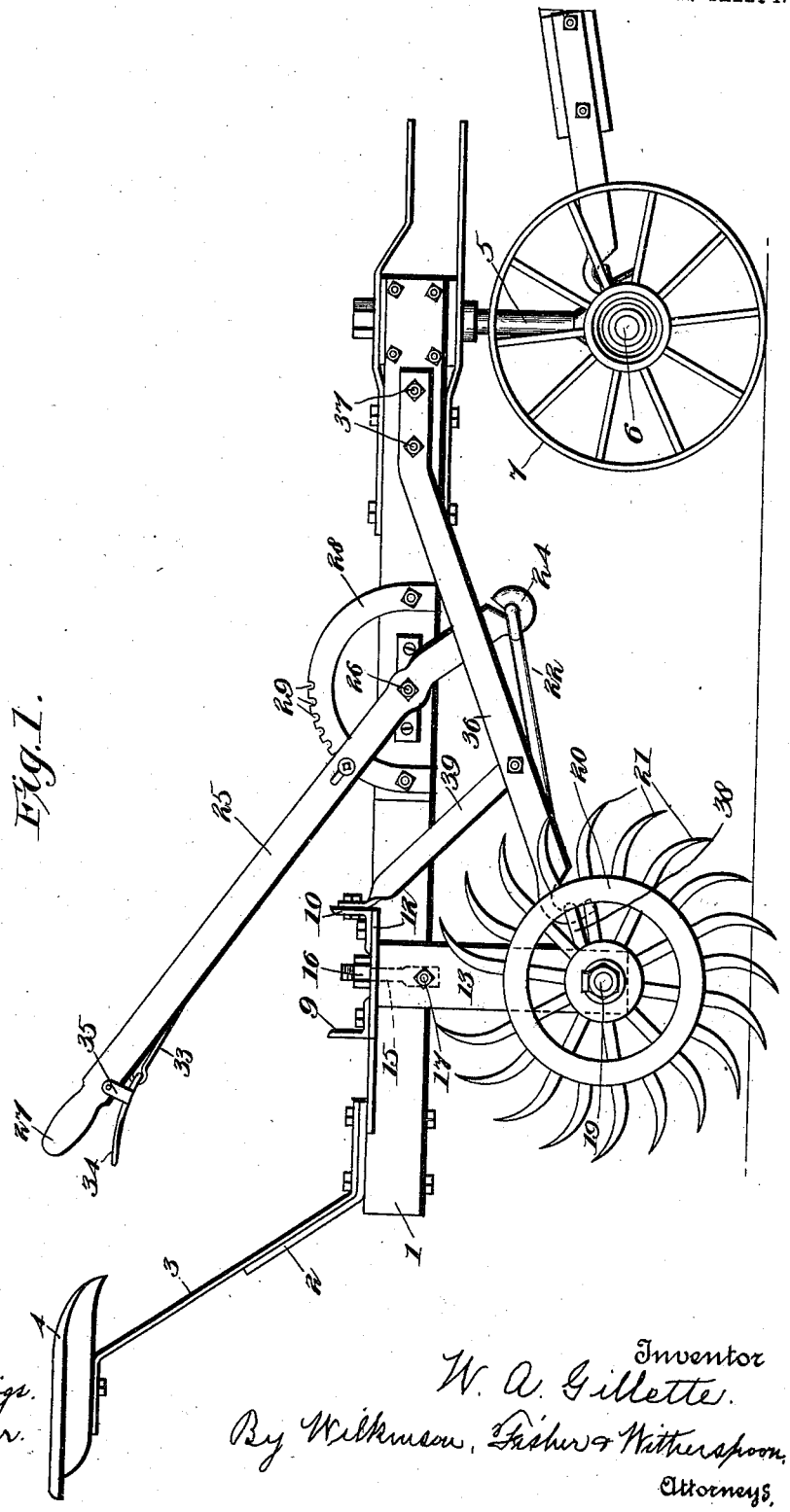
Witnesses
Byron B. Collings.
Edwin J. Beller.
Inventor
W. A. Gillette.
By Wilkinson, Fisher & Witherspoon,
Attorneys.

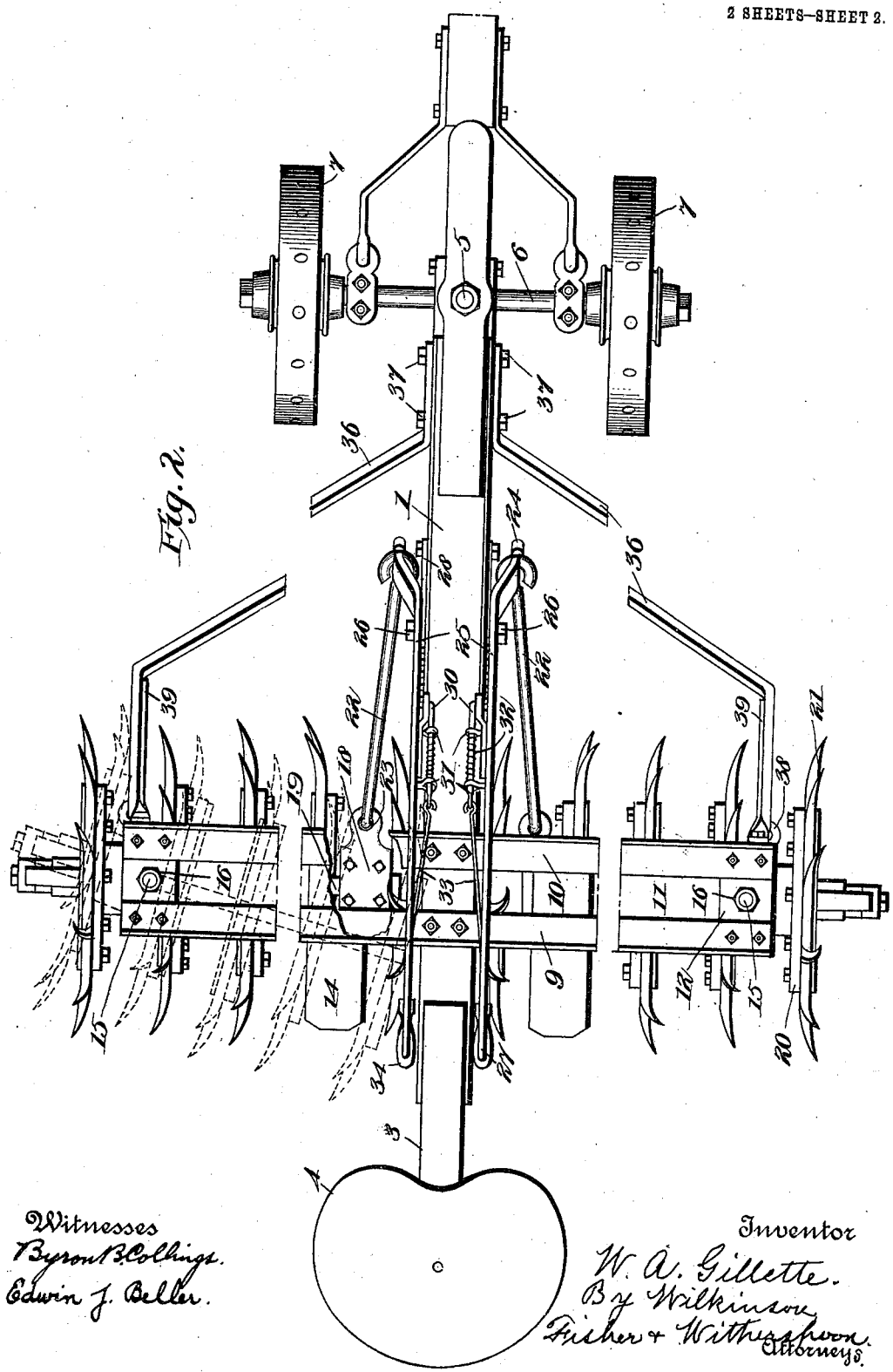

UNITED STATES PATENT OFFICE

WALTER A. GILLETTE, OF LOS ANGELES, CALIFORNIA.

ROTARY ROAD-SCARIFIER.

978,016. Specification of Letters Patent. Patented Dec. 6, 1910.

Application filed September 1, 1910. Serial No. 580,086.

*To all whom it may concern:*

Be it known that I, WALTER A. GILLETTE, a citizen of the United States, residing at Los Angeles, in the county of Los Angeles and State of California, have invented certain new and useful Improvements in Rotary Road-Scarifiers; and I do hereby declare the following to be a full, clear, and exact description of the invention, such as will enable others skilled in the art to which it appertains to make and use the same.

My invention relates to improvements in rotary road scarifiers intended to break up the hard crust of a road bed, which becomes packed from long usage with heavy vehicles passing over it, or which may have been intentionally hardened to stand the traffic thereon, and the object of my invention is to make a simple, strong and easily managed road scarifier composed of a series of gangs or sets of curved-spikes, held between lugs or disks, each gang being separately adjustable.

With this object in view, my invention consists in the construction and combinations of parts as hereinafter described and claimed.

In the accompanying drawings Figure 1 is a side view of my improved road scarifier, and Fig. 2 is a plan view thereof partly broken away and showing in dotted lines one of the gangs adjusted to run at an angle.

1 represents a beam extending centrally through the apparatus provided with a bracket 2, carrying a spring 3, on which is mounted a seat 4 for the driver. The front of the beam 1 is supported in the usual way upon a king bolt 5, which engages with the bearing carrying the axle 6, provided with the wheels 7 and the usual draft appliances.

Extending at right angles to the beam 1 are two angle plates 9 and 10 facing each other, as shown, and bolted or otherwise secured to said beam. These are separated from each other by a space 11, and their outer ends are joined by a plate such as 12. The two sides of the apparatus being made symmetrical, it will be necessary to describe only one side thereof.

13 represents a plate made in the form of an inverted U, the outer end of which rests upon the plate 12, and the inner end of which is free to move, except as hereinafter described.

14 represents a foot rest secured to the angle plates 9 and 10, and the top of the U plate 13 extends inwardly until its inner end is just under said foot rest 14. The plate 13 is supported upon a bolt 15, which passes through the plate 12 and moves freely in said plate, a nut 16 being used to hold said bolt in position. Preferably some means of locking the nut 16 is used, such as a cotter pin, but this is not absolutely necessary.

17 represents the pin screwed into one of the downward projections of the plate 13 and passing through a perforation in the bolt 15, so that the bolt and plate will revolve about the bolt as a center. Attached to the lower end of the U plate 13 are bearings 18 for the shaft 19, one of said bearings being located near the beam 1 and the other near one of the bolts 12.

21 represents steel spikes set firmly in heavy disks 20 which are bound firmly in gangs by a steel axle 19. These spikes 21 extend beyond the disks 20 and at their outer ends are shaped into a double twisted curve so that the points curve rearward and outward as they strike the ground, so as to cut backward and outward through as well as to stick into the ground and thus greatly increase the penetrating and tearing action.

Each of the axles 19 is movable around its bolt 12 as indicated in dotted lines in Fig. 2. This movement is accomplished in the following manner: 22 represents a stout link having hooked ends, one end engaging a perforation 23 in the part 18, and the other end engaging a hook 24 on the lower end of the lever 25, which is pivoted at 26 to the beam 1. The lever 25 is provided with an operating handle 27 and fastened to the beam 1 is a semi-circular annulus 28 provided with teeth 29, and the lower end of a rod 30 is adapted to engage said teeth. Said rod passes through guides 31 and is normally pressed by the spring 32 against said teeth. 33 represents a link connecting said rod with an operating handle 34 carried in a bracket 35 on the lever 25. 36 represents a brace bent in two directions, the forward end of which is attached by bolts 37 to the beam 1, and the rear end of which is hooked and engages an eyelet 38 on one of the downwardly extending arms of the U plate 13. 39 represents a stiffening brace bolted to said brace at one end and at the other end bolted to the angle plate 10.

The operation is as follows:—Under ordinary conditions the parts are as represented in full lines in Fig. 2. Should it be desired to exert a greater tearing action upon the ground, one or both of the levers is moved throwing the shaft with its gang of spike disks into the position shown in dotted lines in Fig. 2.

By the herein described construction an extremely strong, heavy and rugged apparatus is provided, capable of breaking up the crust on greatly hardened road beds, for which it is especially designed, but not suited for use on soft ground, as is the case with those forms of rotary harrows that are now in use.

I claim:

1. In a rotary road scarifier, the combination of a right angled supporting frame, a gang of disks provided with curved spikes supported on each side of the central portion of said frame, and means for separately adjusting and locking each gang of spike disks, substantially as described.

2. In a rotary road scarifier, the combination of a longitudinal beam, draft appliances supporting the front end of said beam, cross bars carried by said beam, an axle provided with a gang of disks provided with curved spikes movably supported near the outer ends of said cross bars, and means for adjusting the inner end of each of said axles and for locking it in its adjusted position, substantially as described.

3. In a rotary road scarifier, the combination of a longitudinal beam, draft appliances supporting the front of said beam, angle bars spaced apart and supported by said beam and located at right angles thereto, plates uniting the outer ends of said angle bars, a bolt passing through each of said plates, a U shaped plate mounted on each of said bolts, an axle, provided with a gang of disks provided with curved spikes, passing through perforations in said U shaped plates, and means for adjusting and locking said U shaped plates and said axles with the spike disks thereon in different positions, substantially as described.

4. In a rotary road scarifier, the combination of a longitudinal beam, draft appliances supporting the front of said beam, angle bars resting on said beam, spaced apart and located at right angles to said beam, plates connecting the outer ends of said angle bars, a bolt projecting downwardly through each of said plates, a U shaped plate supported by each of said bolts, an axle mounted in the lower arms of each of said plates, the axle being provided with a gang of disks provided with curved spikes, means for adjusting the inner ends of each of said axles, said means including a lever pivoted on said beam and a link connecting the lower end of said lever with one end of said U shaped plate, and means for locking said lever including a toothed segment mounted on said beam and a spring operated rod, and braces for stiffening the whole structure, substantially as described.

5. In a rotary road scarifier, the combination of a longitudinal beam, draft appliances supporting the front end of said beam, an axle provided with a series of heavy disks rigidly attached thereto journaled near the rear end of said beam, and a series of teeth curved rearward and outward and adapted both to dig into and to cut the road bed, substantially as described.

6. A rotary road scarifier comprising a supporting frame, a plurality of axles journaled in said frame, with means for swinging said axles through an angle laterally when desired, a series of heavy disks fast on each of said axles, and a series of teeth curved rearward and outward, and adapted to dig into and to cut the road bed, substantially as described.

In testimony whereof, I affix my signature, in presence of two witnesses.

WALTER A. GILLETTE.

Witnesses:
KENNETH F. POSTLE,
EDYTH PALMER.